(12) United States Patent
Yatirajula et al.

(10) Patent No.: US 8,797,893 B2
(45) Date of Patent: Aug. 5, 2014

(54) SYSTEM AND METHOD FOR MANAGING CONFIGURATION DATA ON A MEDIA GATEWAY AND A MEDIA GATEWAY CONTROLLER IN A NEXT GENERATION NETWORK

(75) Inventors: Varadaraj Govindsai Yatirajula, Bangalore (IN); ShivaKumar Channa Made Gowda, Bangalore (IN)

(73) Assignee: Wipro Limited, Bangalore (IN)

( * ) Notice: Subject to any disclaimer, the term of this patent is extended or adjusted under 35 U.S.C. 154(b) by 702 days.

(21) Appl. No.: 12/888,440

(22) Filed: Sep. 23, 2010

(65) Prior Publication Data
US 2012/0076008 A1   Mar. 29, 2012

(51) Int. Cl.
*H04L 12/26* (2006.01)
*H04L 12/24* (2006.01)
(52) U.S. Cl.
CPC ........ *H04L 41/0869* (2013.01); *H04L 41/0806* (2013.01)
USPC ........................................... 370/252; 370/254
(58) Field of Classification Search
USPC .................................. 370/241, 250, 252, 254
See application file for complete search history.

(56) References Cited

U.S. PATENT DOCUMENTS

2006/0198357 A1 * 9/2006 Qiao .............................. 370/351

FOREIGN PATENT DOCUMENTS

WO   PCT/TR2007/000004   9/2007
WO       WO 2007108783 A1 *   9/2007

* cited by examiner

*Primary Examiner* — Chi Pham
*Assistant Examiner* — Weibin Huang
(74) *Attorney, Agent, or Firm* — LeClairRyan, a Professional Corporation

(57) ABSTRACT

A system and method for managing configuration data on a media gateway and a media gateway controller in a next generation network is disclosed. In one embodiment, in a method of managing configuration data on a media gateway (MG) and a media gateway controller (MGC) in a next generation network, it is determined whether all required configuration data is provisioned for the MG by a configuration management module residing in the next generation network upon boot up. If all the required configuration data is not pre-configured, then the configuration management module sends a message to an associated MGC requesting for configuration data. The configuration management module verifies format of the received configuration data upon receiving an acknowledgement and the configuration data by the MG. The configuration management module also stores received configuration data in the MG and provisions the MG upon a successful verification of the configuration data.

18 Claims, 6 Drawing Sheets

SYSTEM AND METHOD FOR MANAGING CONFIGURATION DATA ON A MEDIA GATEWAY AND A MEDIA GATEWAY CONTROLLER IN A NEXT GENERATION NETWORK

BACKGROUND

Telecommunication networks have evolved over the last decade from a time division multiplexing (TDM) to an Internet Protocol (IP) based architecture. IP based telecommunication networks are generally referred to as multimedia over IP (MoIP) networks which encompasses voice (VoIP), video, data, and the like. Architectural evolutions in the IP based telecommunication networks are referred to as next generation networking. The VoIP networks are decomposed; media and signaling are handled by different entities in the VoIP network. Two of the key components in the VoIP network are media gateway controller (MGC) and media gateway (MG). The MGC handles the signaling to setup and tear down calls, and also controls the MG. The MG on the other hand converts the media from TDM to IP and vice versa.

The MGs and MGCs need to be provisioned to bridge between the TDM and IP networks based on carrier and endpoints terminating on it from private branch exchange (PBX) or public switched telephone network (PSTN), codecs and packetization rates supported by digital signaling processing (DSP) cards on the MG, primary and alternate MGC IP addresses, and echo cancellation.

Generally, the MG and the MGC have their own element management systems (EMS) to configure carrier and endpoint data. Usually, no defined standard exists as such for VoIP configuration. Different vendors use their own mechanism in configuring the MG and MGCs. One reason being that the next generation network (NGN) is derived from existing TDM networks which uses legacy technologies to configure network elements. The other reason being that vendors generate significant revenues by charging for configuration of the network elements which need specialized skills. Equipment vendors do not want to lose this revenue stream.

Typically, the MGs are manufactured by third party suppliers and have their own EMS. In general, there would be a separate EMS for the MGC and the MG and they need to be provisioned separately. One drawback of using different EMS for the MGC and the MG is configuration data mismatch. The primary issue is that since the provisioning of the carriers and endpoints needs to be done separately on the MG and the MGC, there is duplication of data on the MG and the MGC. The deployment of large VoIP networks can lead to issues of scale due to number of MGCs and MGs, as well as huge amount of configuration scripts required for configuring all the network elements.

The other drawback being requiring multiple provisioning protocols and technologies during provisioning for the MG and the MGC. Some of the provisioning protocols used are simple web based hypertext markup language (HTML) pages, simple network management protocol (SNMP), EMS, network management system (NMS) and so on. All these protocols are typically used for provisioning the VoIP networks and a single protocol or technology is not adopted universally by all the telecom vendors.

Thus, when provisioning the data in these varied protocols and systems, there may be mistakes in data entry or data formats. In a typical hybrid VoIP/TDM network, there may be thousands of line MGs and hundreds of trunk MGs, hence using different technologies and data formats, and dynamically adding or deleting configuration will inevitably lead to data mismatch. When there is a mismatch in the data of MGC and MG, the carriers and the endpoints will not come into service. This may also lead to wrong mapping of the physical connection on MGC; trunk resources on the MGC may not come in service; there would be difficulty in debugging corruption since the configuration data will be huge in size for large capacity MGC/MG with many carriers/endpoints and would potentially require a re-configuration of the entire MG and MGC. This can result in customer dissatisfaction, loss of revenue and customer attrition to the service providers.

Existing solutions address bulk provisioning of MGs by grouping the carrier and the end points into a management context and managing packet voice networks using a virtual switch approach. This approach defines a virtual network with the MGCs and the MGs and describes how they can be provisioned. Further, the existing solutions require provisioning of the carriers and the endpoints separately on the MG and the MGC, which results in duplication of the data.

Furthermore, when provisioning same data in the MGC and the MG as described above, there may be mistakes in data entry or mismatches in data formats. The other problems with the existing solutions are that, when there is a mismatch in the data on the MGC and the MG, the carriers and the endpoints will not come into service. This could lead to outages and service impacts, separate element management systems need more effort when provisioning the MG and the MGC, and subsequent addition or deletion of MGs from the network may lead to data mismatches.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for managing configuration data on a media gateway and a media gateway controller in a next generation network is disclosed. In the following detailed description of the embodiments of the present subject matter, reference is made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
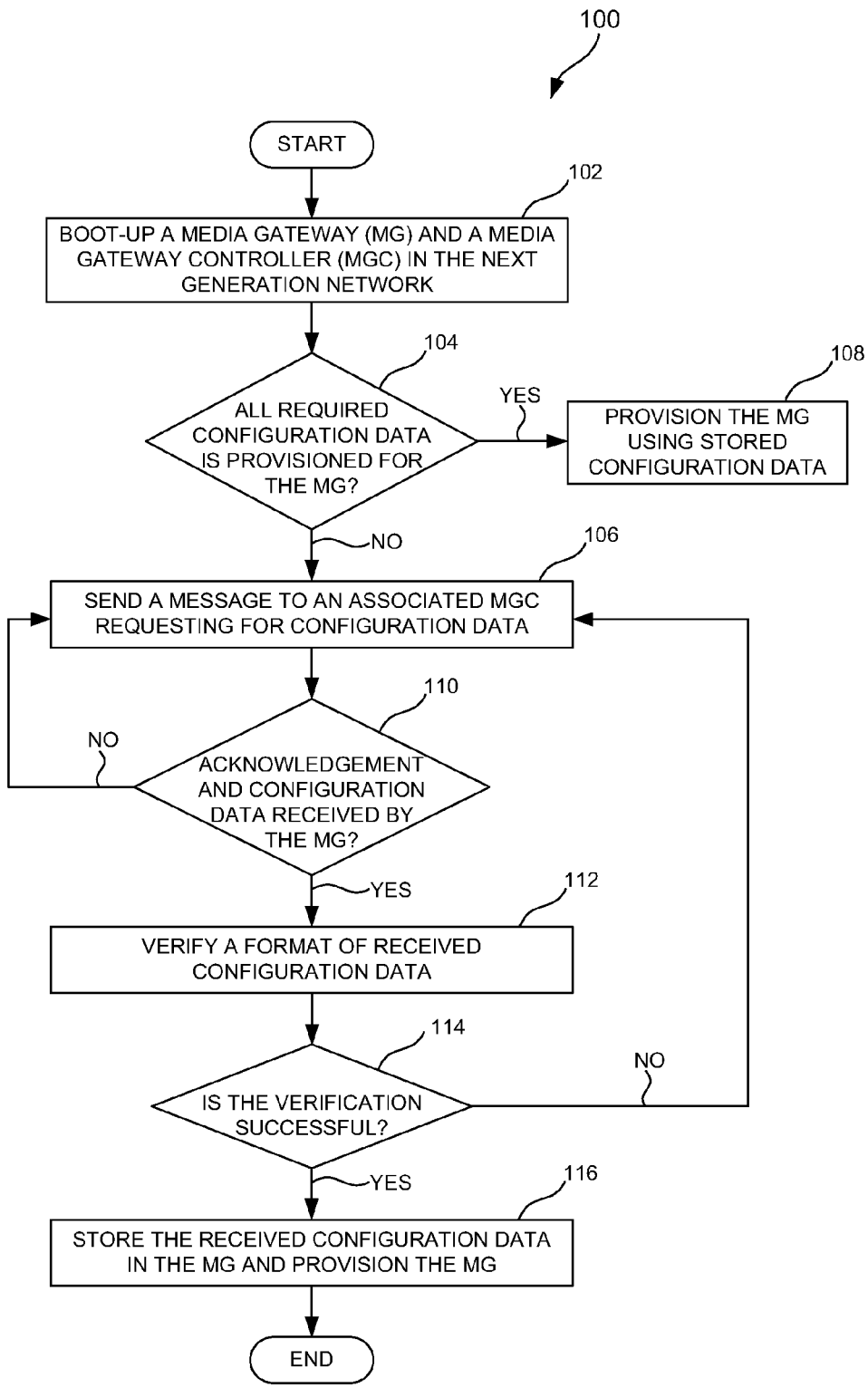
FIG. 1 illustrates a flow diagram of a method for managing configuration data on a media gateway (MG) and a media gateway controller (MGC) in a next generation network, according to one embodiment.

FIG. 1 illustrates a flow diagram 100 of a method for managing configuration data on a media gateway (MG) and a media gateway controller (MGC) in a next generation network (e.g., the VoIP network 500 of FIG. 5), according to one embodiment. At step 102, the MG and the MGC are booted-up. At step 104, it is determined whether all required configuration data is provisioned for a MG (e.g., the MG1 of FIG. 5) by a configuration management module (e.g., the configuration management module 516A of FIG. 5) residing in the next generation network. If it is determined that all required configuration data are not provisioned for the MG, then step 106 is performed, else step 108 is performed.

At step 106, a message is sent by the configuration management module to an associated MGC (e.g., the MGC1 of FIG. 5) requesting for configuration data. At step 108, the MG is provisioned using the stored configuration data. At step 110, it is determined whether an acknowledgement and the configuration data are received by the MG. If it is determined so, step 112 is performed, else the method is routed to perform the step 106 upon a timeout. When a predetermined number of timeouts is reached, an audit process may be started which periodically (e.g., every minute) requests the configuration data from the associated MGC.

At step 112, a format of received configuration data is verified by the configuration management module. At step 114, it is determined whether the verification is successful. If it is determined that the verification is successful, step 116 is performed, else the method is routed to perform step 106. At step 116, the received configuration data is stored in the MG by the configuration management module and the MG is provisioned.

Figure 2:
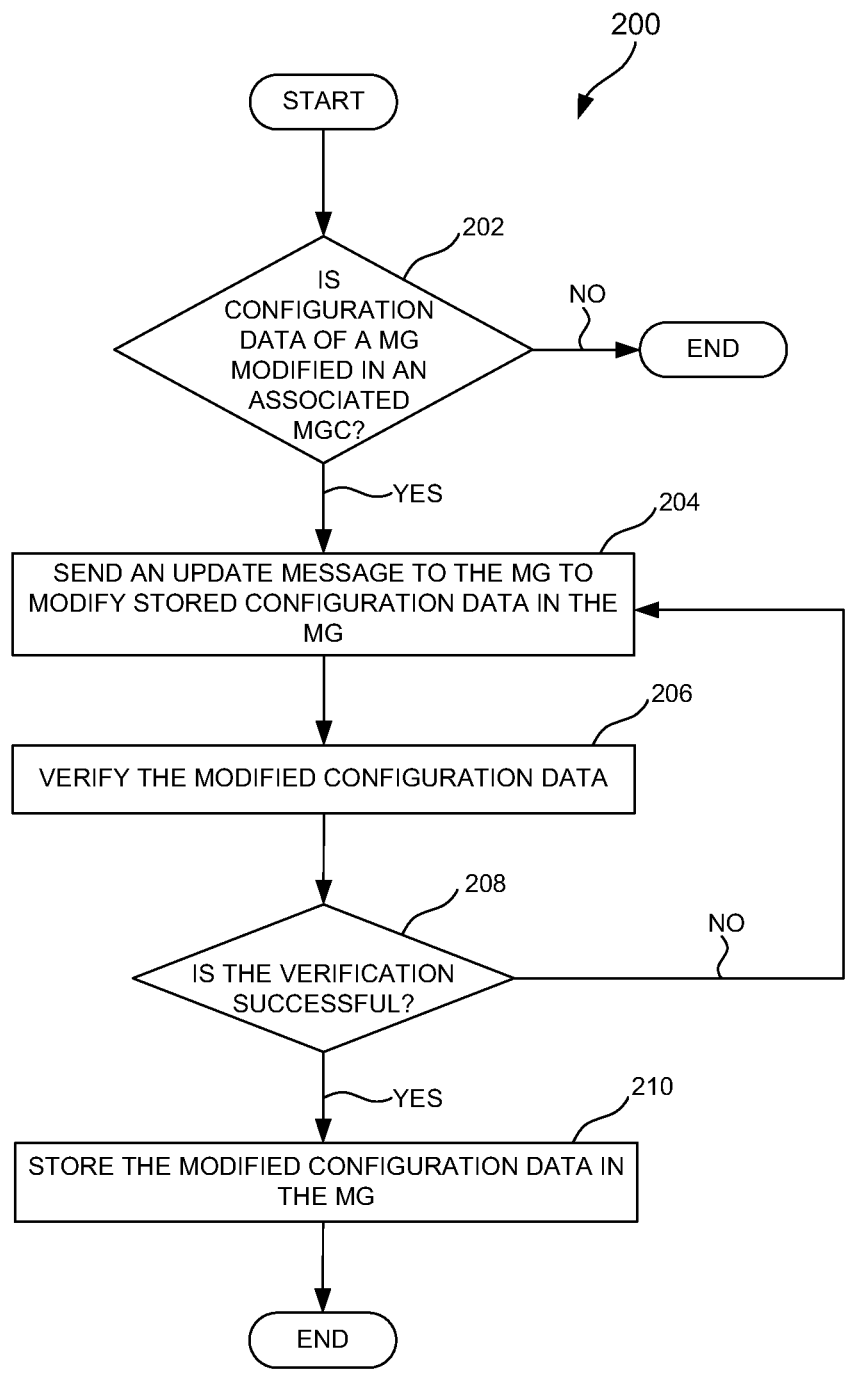
FIG. 2 illustrates a flow diagram of a method for managing configuration data on a MG and a MGC when the configuration data on the MGC is modified in a next generation network, according to one embodiment.

FIG. 2 illustrates a flow diagram 200 of a method for managing configuration data on a MG and a MGC when the configuration data on the MGC is modified in a next generation network (e.g., the VoIP network 500 of FIG. 5), according to one embodiment. At step 202, it is determined whether the configuration data of a MG (e.g., the MG1 of FIG. 5) on an associated MGC (e.g., the MGC1 of FIG. 5) is modified. For example, the determination may be performed periodically. If it is determined that the configuration data on the associated MGC is modified, step 204 is performed, else the method is ended. At step 204, an update message is sent to the MG to modify stored configuration data in the MG.

At step 206, the modified configuration data is verified by a configuration management module (e.g., the configuration management module 516A of FIG. 5) upon receiving the update message. At step 208, it is determined whether the verification is successful. If the verification is successful, step 210 is performed, else the method is routed to perform step 204. At step 210, the modified configuration data is stored in the MG by the configuration management module.

Figure 3A:
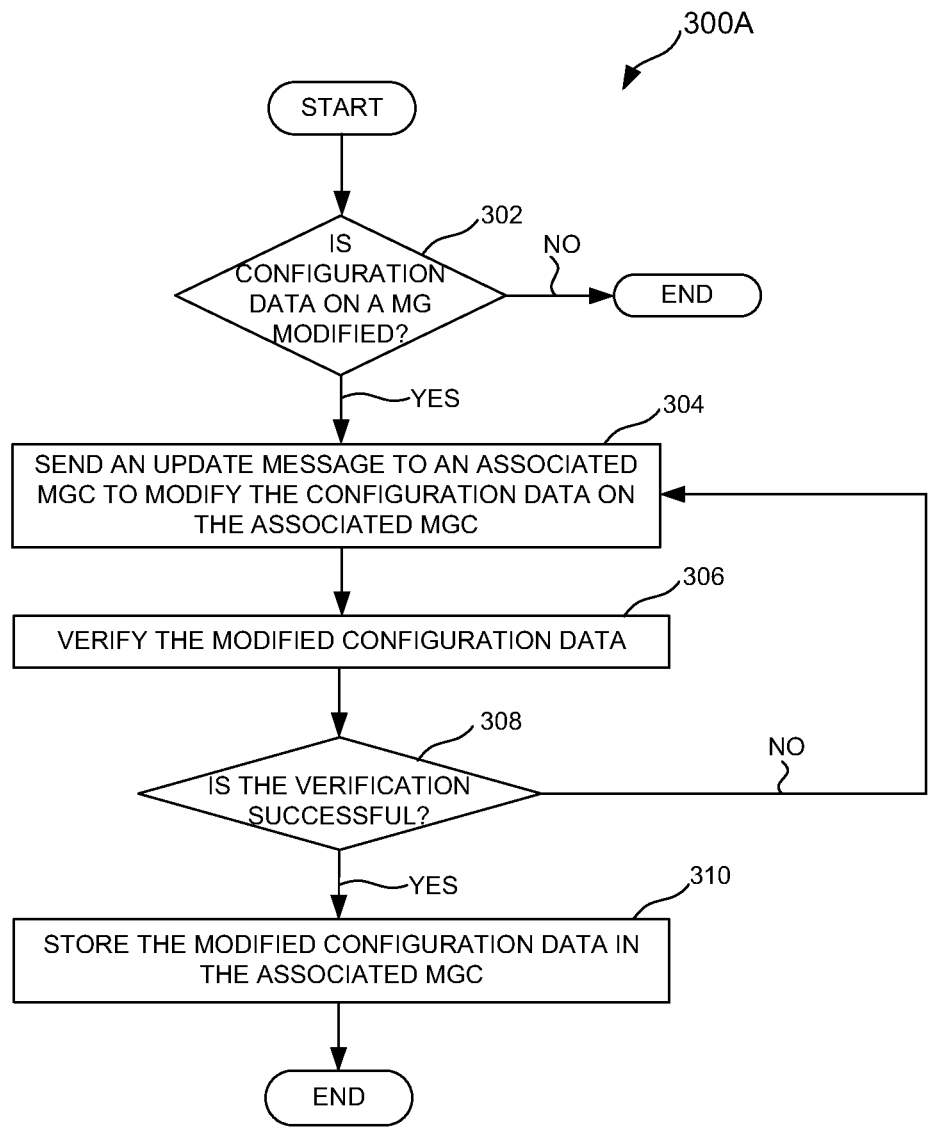
FIG. 3A illustrates a flow diagram of a method for managing configuration data on a MG and a MGC when the configuration data on the MG is modified in a next generation network, according to one embodiment.

FIG. 3A illustrates a flow diagram 300A of a method for managing configuration data on a MG and a MGC when the configuration data on the MG is modified in a next generation network (e.g., the VoIP network 500 of FIG. 5), according to one embodiment. At step 302, it is determined whether the configuration data on a MG (e.g., the MG1 of FIG. 5) is modified. For example, the determination may be performed periodically. If it is determined that the configuration data on the MG is modified, step 304 is performed, else the method is ended. At step 304, an update message is sent to an associated MGC (e.g., the MGC1 of FIG. 5) to modify the configuration data on the associated MGC.

At step 306, the modified configuration data is verified by a configuration management module (e.g., the configuration management module 516B of FIG. 5) upon receiving the update message. At step 308, it is determined whether the verification is successful. If the verification is successful, step 310 is performed, else the method is routed to perform step 304. At step 310, the modified configuration data is stored in the associated MGC by the configuration management module.

Figure 3B:
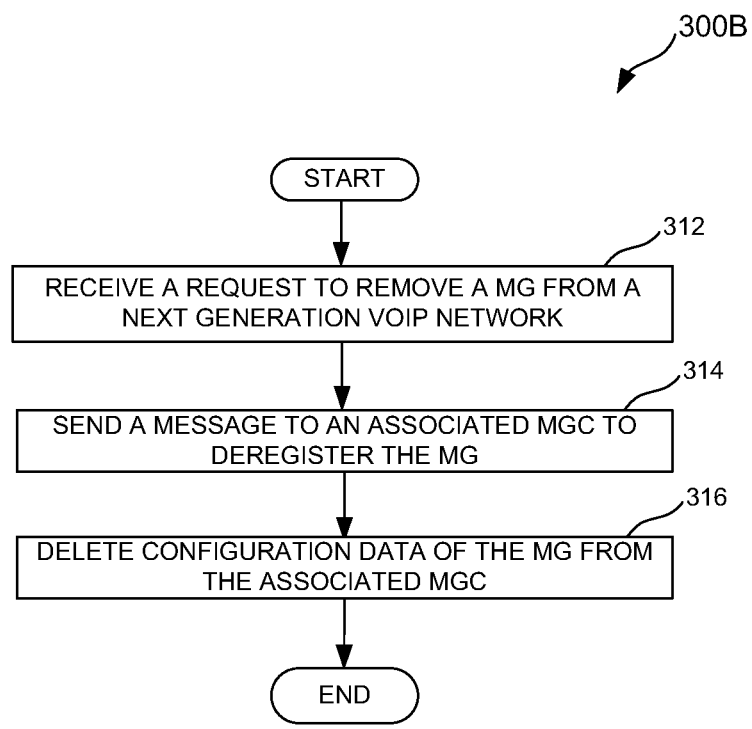
FIG. 3B illustrates a flow diagram of a method for managing configuration data on a MG and a MGC when the MG is removed from a next generation network, according to one embodiment.

FIG. 3B illustrates a flow diagram 300B of a method for managing configuration data on a MG and a MGC when the MG is removed from a next generation network (e.g., the VoIP network 500 of FIG. 5), according to one embodiment. At step 312, a request to remove a MG (e.g., the MG1 of FIG. 5) from the next generation network is received. At step 314, a message is sent to an associated MGC (e.g., the MGC1 of FIG. 5) to deregister the MG by a configuration management module (e.g., the configuration management module 516B of FIG. 5). At step 316, configuration data of the MG is deleted from the associated MGC.

Figure 4:
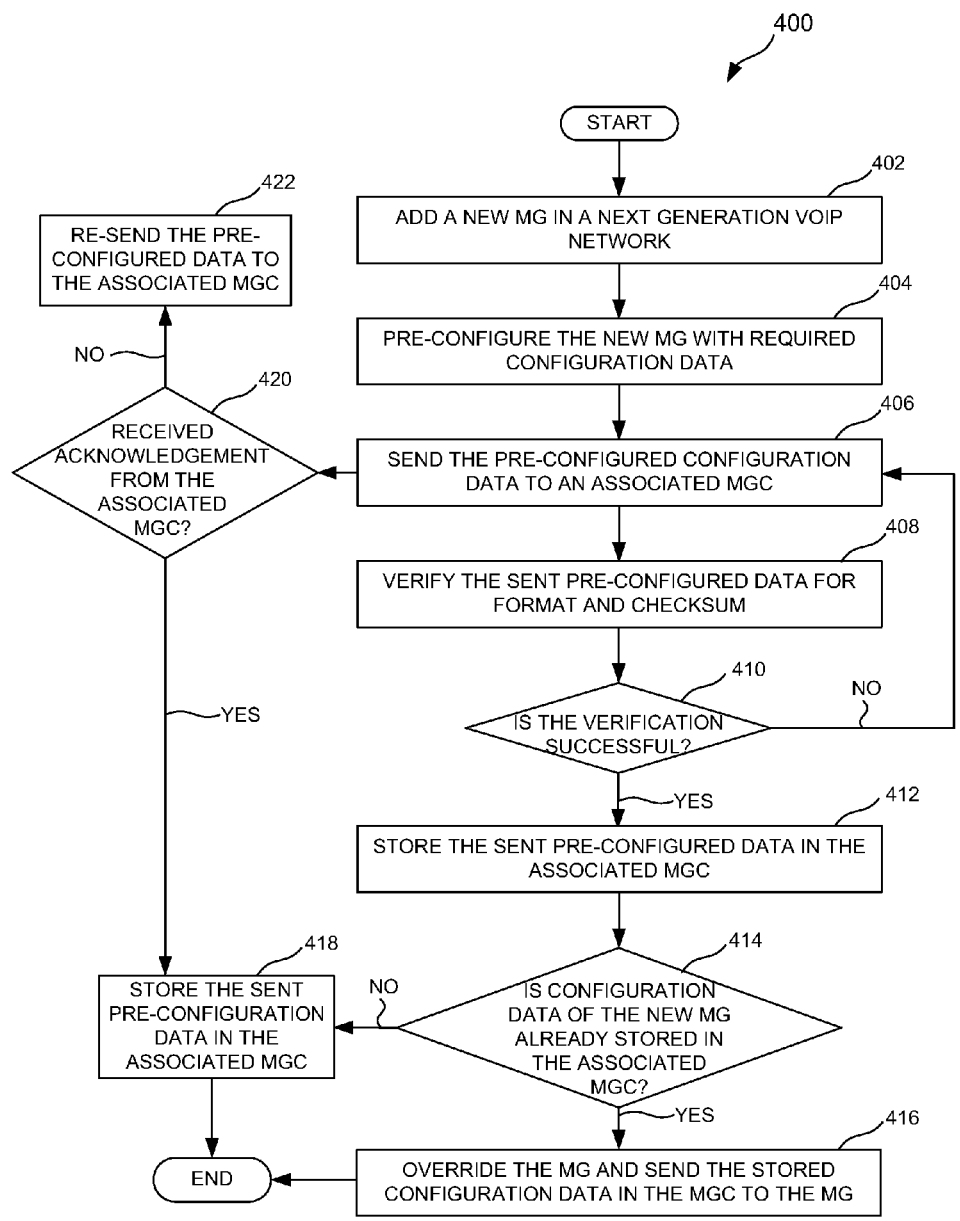
FIG. 4 illustrates a flow diagram of a method for managing configuration data on a MG and a MGC when the MG is newly added to a next generation network, according to one embodiment.

FIG. 4 illustrates a flow diagram 400 of a method for managing configuration data on a MG and a MGC when the MG is newly added to a next generation network (e.g., the VoIP network 500 of FIG. 5), according to one embodiment. At step 402, a new MG (e.g., the MG1 of FIG. 5) is added in the next generation network. At step 404, the new MG is pre-configured with required configuration data by a configuration management module associated with the new MG (e.g., the configuration management module 516A of FIG. 5). At step 406, the pre-configured configuration data is sent to an associated MGC (e.g., the MGC1 of FIG. 5) by the configuration management module.

At step 408, the sent pre-configured data is verified for format and checksum by the configuration management module. At step 410, it is determined whether the verification is successful. If the verification is successful, step 412 is performed, else the method is routed to perform the step 406. At step 412, the sent pre-configured data is stored in the associated MGC by the configuration management module. At step 414, it is determined whether the configuration data of the new MG is already stored in the associated MGC. If it is determined so, step 416 is performed, else step 418 is performed.

At step 416, the MG is overridden and the stored configuration data in the associated MGC is sent to the MG by the configuration management module in the associated MGC. At step 418, the sent pre-configuration data is stored in the associated MGC by the configuration management module. Further, upon sending the pre-configured data to the associated MGC, at step 420, it is determined whether an acknowledgement of receiving the pre-configured data is obtained from the associated MGC by the configuration management module.

If it is determined so, step 418 is performed where the pre-configuration data is stored in the associated MGC. If it is determined not, step 422 is performed where the pre-configured data is resent to the associated MGC within a predetermined time interval by the configuration management module. Moreover, in one example embodiment, a non-transitory computer-readable storage medium for managing the configuration data on the MG and the MGC in the next generation network has instructions that, when executed by a computing device causes the computing device to perform the method described in FIGS. 1 through 4.

Figure 5:
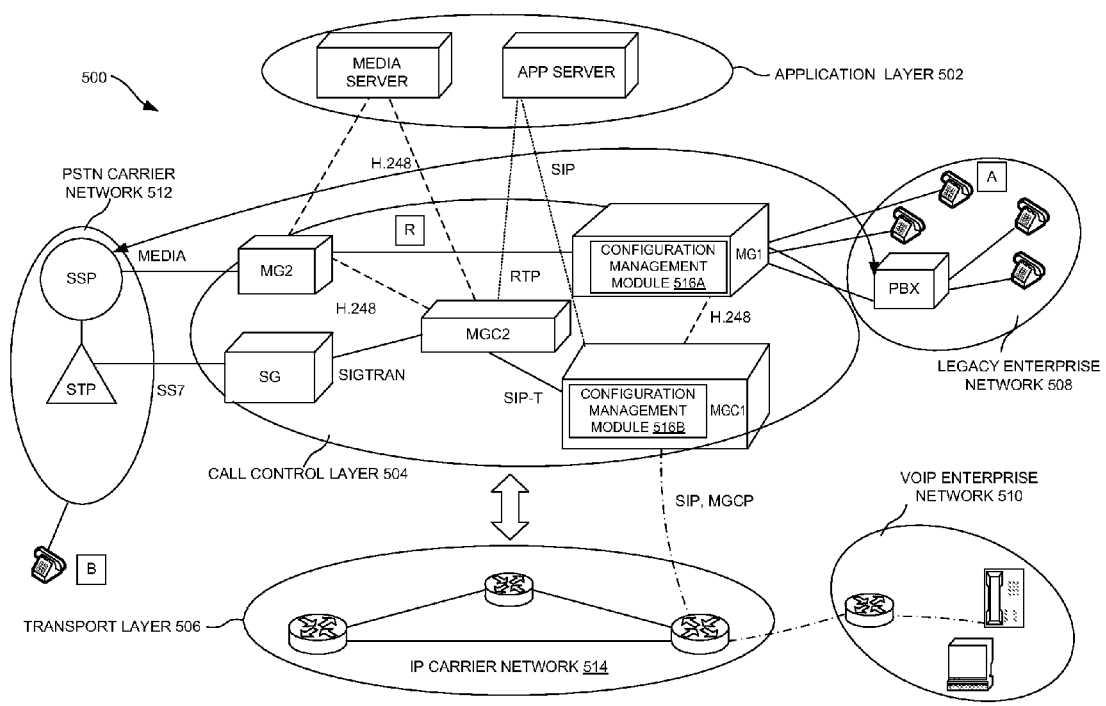
FIG. 5 illustrates a VoIP network implementing auto provisioning of the MG and the MGC, according to one embodiment.

FIG. 5 illustrates a VoIP network 500 implementing auto provisioning of a MG1 and a MGC1, according to one embodiment. As shown, the VoIP network 500 includes an application layer 502, a call control layer 504, and a transport layer 506. The VoIP network may include a plurality of MGs and associated MGCs. Consider that a call is made by a subscriber A in a legacy enterprise network 508 to a subscriber B in a public switched telephone network (PSTN) carrier network 512. The legacy enterprise network 508 and PSTN carrier network 512 are connected via an IP carrier network (CN) 514. The call enters the IP CN 514 via the MG1.

The MGC1 then determines that the call is destined for MGC2 and routes the call to MGC2. The MGC1 also associates physical endpoint terminating from the private branch exchange (PBX) to a real-time transfer protocol (RTP) termination. The media flows between the MG1 and the MG2 via RTP stream R. The MGC2 subsequently routes the call to the PSTN carrier network 512 via the MG2. The MG2 connects the RTP stream R to a trunk circuit terminating to it from signaling transfer point (STP).

According to an embodiment of the present subject matter, the call control layer 504 includes a configuration management module for auto provisioning resources in the VoIP network 500. As shown in FIG. 5, the MG1 and MGC1 include a configuration management module 516A and a configuration management module 516B, respectively. Alternatively, an H.248 protocol between the MG1 and the MGC1 may be modified for the auto provisioning. In one exemplary implementation, the configuration management module 516A determines whether all required configuration data is provisioned for the MG1 upon boot up.

The configuration data of the MG1 and the MGC1 includes endpoint and carrier information (e.g., carrier type and protocol type will be defined), list of supported codecs, list of supported packetization rates, echo cancellation, primary and alternate MGC IP address, etc. Additionally, the MGC1 includes configuration data such as routing tables, peer MGC1 configuration, application server configuration, media server configuration, signaling gateway configuration, etc.

If all the required configuration data is not pre-configured, then the configuration management module 516A sends a message to the MGC1 requesting for configuration data. The configuration management module 516A also verifies a format of the received configuration data upon receiving an acknowledgement and the configuration data by the MG1. Then, the configuration management module 516A stores the received configuration data in the MG1 and provisions the MG1 upon a successful verification of the configuration data. Upon an unsuccessful verification of the configuration data, the configuration management module 516A resends the message to the MGC1 requesting for configuration data.

If all the required configuration data is pre-configured, then the MG1 is provisioned using stored configuration data. It should be noted that, the configuration management module 516A resends the request for configuration data to the MGC1 upon a timeout and starts an audit process upon a predetermined number of timeouts. The audit process periodically requests the configuration data from the MGC1.

Further, the configuration management module 516B determines periodically whether the configuration data of the MG1 on the MGC1 is modified. If it is determined so, an update message is sent to modify stored configuration data in the MG1. Upon receiving the update message, the configuration management module 516A verifies the modified configuration data and upon successful verification, the configuration management module 516A stores the modified configuration data in the MG1.

Furthermore, the configuration management module 516A determines periodically whether the configuration data on the MG1 is modified. If it is determined so, an update message is sent to the MGC1 to modify the configuration data on the MGC1. Also, the MG1 may be deregistered from the MGC1 by the configuration management module 516A upon a request to remove the MG1 from the VoIP network 500. Consequently, the configuration data is deleted from the MGC1.

When a new MG is added in the VoIP network 500, the configuration management module residing in the new MG pre-configures the new MG with required data. Then, the configuration management module sends the pre-configured data to an associated MGC. The sent pre-configured data is verified for format and checksum by the configuration management module. Upon successful verification of the sent pre-configured data, the sent pre-configured data is stored in the associated MGC by the configuration management module.

In one embodiment, the configuration management module determines whether the configuration data of the new MG is already stored in the associated MGC. If it is determined so, the configuration management module overrides the new MG and the stored configuration data in the associated MGC is sent to the new MG. If it is determined not, the configuration management module stores the sent pre-configuration data in the associated MGC.

Further, upon sending the pre-configured data to the associated MGC, the configuration management module determines whether an acknowledgement of receiving the pre-configured data is obtained from the associated MGC. If it is determined not, the configuration management module resends pre-configured data to the associated MGC within a predetermined time interval. If it is determined so, the configuration management module stores the sent pre-configured data in the associated MGC.

In various embodiments, the above-described methods and systems of FIGS. 1 through 5 enable auto provisioning of MGs and MGCs in the next generation network. Either one of the MG or the MGC needs to be provisioned which is shared by the other upon requests. Hence the above-described methods and systems avoid data mismatch and service outages in the next generation network. There is no need of multiple provisioning protocols for configuring the next generation network. New resources can be dynamically added to the MG and these resources can be auto-provisioned on the MGC or the MG. Thus, the above-described methods and systems reduce effort and cost in provisioning the next generation network since the data needs to be provisioned only once.

Although, the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method for managing configuration data on a media gateway (MG) and a media gateway controller (MGC) in a next generation network, comprising:
   determining, by a configuration manager computing device, whether all required configuration data is provisioned for the media gateway residing in a next generation network upon boot up;
   sending, by the configuration management computing device, a message to a media gateway controller associated with the media gateway requesting for configuration data when all the required configuration data is determined not to be provisioned, wherein the sending further comprises resending the request for configuration data to the associated media gateway controller upon reaching a timeout and starting an audit process upon a reaching pre-determined number of timeouts;
   receiving, by the configuration manager computing device, an acknowledgement and all the required configuration data from the media gateway controller in response to sending the message, wherein the receiving further comprises, verifying, by the configuration management computing device, a format of the received configuration data; and
   storing, by the configuration manager computing device, the received configuration data in the media gateway and provisioning the media gateway upon a successful verification of the configuration data.

2. The method of claim 1, further comprising:
   provisioning, by the configuration manager computing device, the media gateway using a stored configuration data when all the required configuration data is determined to be pre-configured.

3. The method of claim 1, further comprising:
   resending, by the configuration manager computing device, the message to the media gateway controller associated with the media gateway when verification of the received configuration data is unsuccessful.

4. The method of claim 1, further comprising:
   determining, by the configuration manager computing device, periodically whether the configuration data of the media gateway on the associated media gateway controller is modified;
   sending an update message to modify stored configuration data in the media gateway when the configuration data of the media controller on the associated media gateway controller is determined to be modified; and
   verifying, by the configuration manager computing device, the modified configuration data upon receiving the update message and upon successful verification, storing, by the configuration manager computing device, the modified configuration data in the media gateway.

5. The method of claim 1, further comprising:
   determining periodically whether the configuration data on the media gateway is modified; and
   sending an update message to the associated media gateway controller to modify the configuration data on the associated media gateway controller when configuration data is determined to be modified.

6. The method of claim 1, further comprising:
   deregistering, by the configuration manager computing device, the media gateway from the associated media gateway controller upon a request to remove the media gateway from the next generation network; and
   deleting the configuration data of the media gateway from the associated media gateway controller.

7. The method of claim 1, further comprising:
   pre-configuring, by the configuration manager computing device, the new media gateway with required configuration data upon adding a new media gateway in the next generation network;
   sending, by the configuration manager computing device, the pre-configured configuration data to the associated media gateway controller;
   verifying, by the configuration manager computing device, the sent pre-configured configuration data for format and checksum;
   storing, by the configuration manager computing device, the sent pre-configured configuration data in the associated upon successful verification of the sent pre-configured data.

8. The method of claim 7, further comprising:
   determining, by the configuration manager computing device, whether the configuration data of the new media gateway is already stored in the associated media gateway controller;
   overriding, by the configuration manager computing device, the new MG and sending the stored configuration data in the associated media gateway controller to the new media gateway when the configuration data of the new media gateway is determined to be stored in the associated media gateway controller; and
   storing, by the configuration manager computing device, the sent pre-configured configuration data in the associated media gateway controller when the configuration data of the new media gateway is not determined to be stored in the associated media gateway controller.

9. The method of claim 7, further comprising:
   determining, by the configuration manager computing device, whether an acknowledgement of receiving the pre-configured configuration data is obtained from the associated media gateway controller upon sending the pre-configured configuration data to the associated media gateway controller;
   resending, by the configuration manager computing device, the pre-configured data to the associated media gateway controller within a predetermined time interval when the acknowledgement is not determined to have been obtained from the associated media gateway controller; and
   storing, by the configuration manager computing device, the sent pre-configured configuration data in the associated media gateway controller when the acknowledgement is not determined to have been obtained from the associated media gateway controller.

10. A non-transitory computer-readable storage medium for managing configuration data on a media gateway and a media gateway controller in a next generation network having instructions that, when executed by a computing device causes the computing device to perform a method comprising:
    determining whether all required configuration data is provisioned for the media gateway in the next generation network upon boot up;
    sending a message to a media gateway controller associated with the media gateway requesting for configuration data when all the required configuration data is determined not to be provisioned, wherein the sending further comprises resending the request for configuration data to the associated media gateway controller upon reaching a timeout and starting an audit process upon a reaching pre-determined number of timeouts;

receiving, an acknowledgement and all the required configuration data from the media gateway controller in response to sending the message, wherein the receiving further comprises, verifying a format of the received configuration data; and storing the received configuration data in the media gateway and provisioning the media gateway upon a successful verification of the configuration data.

11. A configuration manager computing device comprising:

a memory; and a processor coupled to the memory and configured to execute programmed instructions stored in the memory, comprising:

determining whether all required configuration data is provisioned for the plurality of media gateways upon boot up;

sending a message to a media gateway controller associated with the media gateway requesting for configuration data when all the required configuration data is determined not to be provisioned, wherein the sending further comprises resending the request for configuration data to the associated media gateway controller upon reaching a timeout and starting an audit process upon a reaching pre-determined number of timeouts;

receiving, an acknowledgement and all the required configuration data from the media gateway controller in response to sending the message, wherein the receiving further comprises, verifying a format of the received configuration data; and storing the received configuration data in the media gateway and provisioning the media gateway upon a successful verification of the configuration data.

12. The device as set forth in claim 11, wherein the processor is further configured to execute programmed instructions stored in the memory further comprising provisioning the plurality of media gateways using stored configuration data if all the required configuration data is pre-configured.

13. The device as set forth in claim 11, wherein the processor is further configured to execute programmed instructions stored in the memory further comprising resending the message to the plurality of associated media gateway controllers requesting for configuration data upon an unsuccessful verification of the configuration data.

14. The device as set forth in claim 11, wherein the processor is further configured to execute programmed instructions stored in the memory further comprising:

determining periodically whether the configuration data of the plurality of media gateway on the plurality of associated media gateway controller is modified;

sending an update message to modify stored configuration data in the plurality of media gateway when the configuration data of the plurality of media gateway on the plurality of associated media gateway controller is determined to be modified; and upon receiving the update message, verifying the modified configuration data and upon successful verification, storing the modified configuration data in the plurality of media gateway.

15. The device as set forth in claim 11, wherein the processor is further configured to execute programmed instructions stored in the memory further comprising:

determining periodically whether the configuration data on the plurality of media gateway is modified;

sending an update message to the plurality of associated media gateway controller to modify the configuration data on the plurality of associated media gateway controller when the configuration data on the plurality of media gateway is determined to be modified.

16. The device as set forth in claim 11, wherein the processor is further configured to execute programmed instructions stored in the memory further comprising:

deregistering the plurality of media gateway from the plurality of associated media gateway controller upon a request to remove the plurality of media gateway from the next generation network; and deleting the configuration data of the plurality of media gateway from the plurality of associated media gateway controller.

17. The device as set forth in claim 11, wherein the processor is further configured to execute programmed instructions stored in the memory further comprising:

pre-configuring a new media gateway with required configuration data upon adding the new media gateway in the next generation network;

sending the pre-configured configuration data to an associated one of the plurality of media gateway controller;

verifying the sent pre-configured configuration data for format and checksum;

upon successful verification of the sent pre-configured configuration data, storing the sent pre-configured configuration data in the associated one of the plurality of media gateway controller.

18. The device as set forth in claim 17, wherein the processor is further configured to execute programmed instructions stored in the memory further comprising:

determining whether the pre-configured configuration data of the new media gateway is already stored in the associated one of the plurality of media gateway controller;

overriding the new media gateway and sending the stored configuration data in the associated one of the plurality of media gateway controller to the new media gateway when the pre-configured configuration data of the new media gateway is determined to be stored; and storing the sent pre-configured configuration data in the associated one of the plurality of media gateway controller when the pre-configured configuration data of the new media gateway is not determined to be stored.

* * * * *